W. GOODWIN.
COUPLING VEHICLES.
No. 182,656.        Patented Sept. 26, 1876.
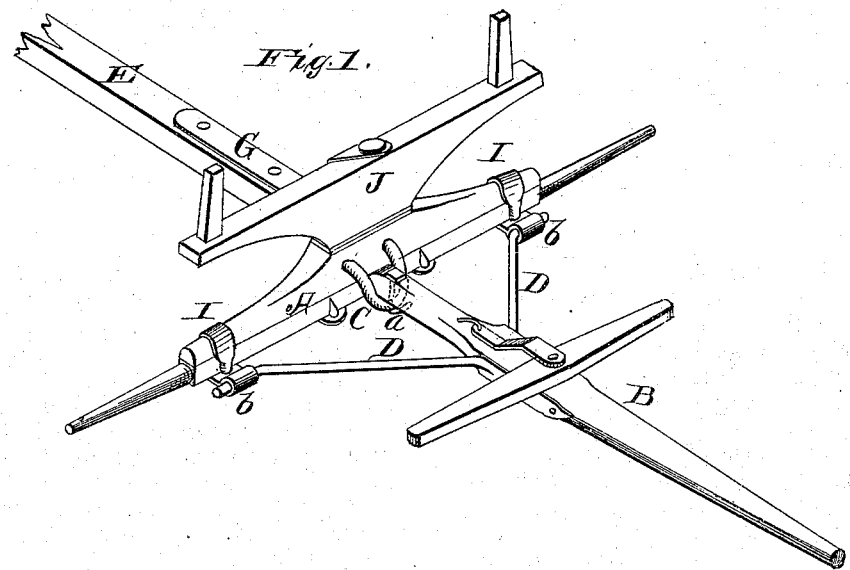
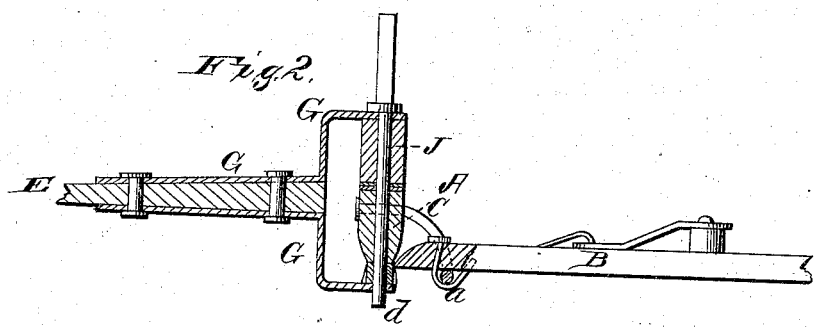
WITNESSES
Franck L. Ouraud
C. L. Evert
INVENTOR
Williamson Goodwin
By Alexander Mason
Attorneys

UNITED STATES PATENT OFFICE.

WILLIAMSON GOODWIN, OF HELENA, ARKANSAS.

IMPROVEMENT IN COUPLING VEHICLES.

Specification forming part of Letters Patent No. 182,656, dated September 26, 1876; application filed August 2, 1876.

*To all whom it may concern:*

Be it known that I, WILLIAMSON GOODWIN, of Helena, in the county of Phillips, and in the State of Arkansas, have invented certain new and useful Improvements in Wagons, Buggies, and Carriages; and do hereby declare that the following is a full, clear, and exact description thereof, reference being had to the accompanying drawings, and to the letters of reference marked thereon, making a part of this specification.

My invention relates to vehicles; and it consists in the devices for connecting the tongue to the front axle, and also for connecting the reach or coupling-pole to the front axle and bolster, as will be hereinafter more fully set forth.

In order to enable others skilled in the art to which my invention appertains to make and use the same, I will now proceed to describe its construction and operation, referring to the annexed drawing, in which—

Figure 1 is a perspective view of my invention. Fig. 2 is a section of a part thereof.

A represents the front axle of a vehicle, and B is the tongue thereof. From the center of the axle A projects a hook, C, forward and downward, and this hook passes through a staple, *a*, at the rear end of the tongue, on the under side, thus connecting or attaching the axle and tongue together.

From each side of the tongue B extends a brace-rod, D, the rear end of which passes through a strap, *b*, fastened to the axle-clip I by the bolts and nuts of the same. By this means the hounds on wagons and bows on buggy-tongues are entirely dispensed with.

E represents the reach or coupling-pole of the vehicle, having, at its front end, top and bottom straps G G, bolted to it, said straps being bent in angular form, as shown, to form a clamp from the top of the rocking bolster J to the bottom of the axle; and through the ends of these straps passes the king-bolt *d*, by which means I prevent the careening of the bolster forward, backward, or sidewise, and doing entirely away with the false or sand bolster, and bringing the rocking bolster directly on the axle.

Having thus fully described my invention, what I claim as new, and desire to secure by Letters Patent, is—

1. The combination of the axle A, provided with clips I I, having loops *b* and the projecting central loop C, with the tongue B, having staple *a* and the braces D D connected to the tongue and inserted in the loops *b*, all substantially as and for the purposes herein set forth.

2. In combination with the axle A and reach E, the angular metallic plates G G, connected to the top and bottom of the reach, and projecting over and under the bolster J and axle A, respectively, and the king-bolt *d*, passing through both plates, bolster, and axle, substantially as herein set forth.

In testimony that I claim the foregoing I have hereunto set my hand this 23d day of June, 1876.

WILLIAMSON GOODWIN.

Witnesses:
S. D. G. NILES,
R. C. HAMMOND.